United States Patent [19]

Winchell

[11] 4,106,605

[45] Aug. 15, 1978

[54] CENTRIFUGAL AND ONE WAY CLUTCHES IN SERIES WITH FRICTION CLUTCH

[75] Inventor: Frank J. Winchell, Orchard Lake, Mich.

[73] Assignee: General Motors Corporation, Detroit, Mich.

[21] Appl. No.: 749,917

[22] Filed: Dec. 13, 1976

[51] Int. Cl.² .................. F16D 43/14; F16D 21/08; F16D 41/04
[52] U.S. Cl. .......................... 192/105 CD; 192/48.4; 192/89 B
[58] Field of Search ............... 192/105 CD, 105 CE, 192/105 BA, 103 B, 48.4

[56] References Cited

U.S. PATENT DOCUMENTS

| 2,899,033 | 8/1959 | Bochory | 192/105 BA X |
| 3,000,480 | 9/1961 | Bochory | 192/105 CD X |
| 3,255,855 | 6/1966 | Peras | 192/105 BA |

FOREIGN PATENT DOCUMENTS

| 730,367 | 5/1955 | United Kingdom | 192/105 CD |
| 800,683 | 8/1958 | United Kingdom | 192/48.4 |
| 888,191 | 1/1962 | United Kingdom | 192/48.4 |

*Primary Examiner*—Benjamin W. Wyche
*Attorney, Agent, or Firm*—A. M. Heiter

[57] ABSTRACT

A multiclutch drive having an input connected in series by a centrifugally engaged clutch, an intermediate drive and a spring engaged manually disengaged friction clutch to drive the output and a one way clutch between the intermediate drive and input which is engaged when the intermediate drive speed exceeds the input speed. Manual disengagement of the friction clutch provides positive neutral. For normal drive, manual engagement permits the spring engagement of the friction clutch and manually increasing engine throttle and engine speed engages the centrifugal clutch for normal vehicle drive. For a push start the friction clutch is manually disengaged while bringing the vehicle up to starting speed and then engaged to drive the intermediate drive to engage the one way clutch to drive the input for engine starting. The clutches are structurally arranged with the centrifugal clutch hub and the inner race of the one way clutch fixed to the input shaft. The centrifugal clutch shoes are pivoted on the hub and engage the ring portion of a centrifugal inner clutch drum having a disk backing plate portion fixed to the outer race of the one way clutch. An outer drum has a ring portion movably mounted on the inner drum ring portion and a disk apply plate. A friction clutch driven plate between the backing and apply plates, rotates on the outer race and drives the output. A cover is secured to the free end of the outer drum. A belleville spring engages the inner drum and the cover to bias the outer drum to engage the friction clutch and to rotate the drums together.

4 Claims, 6 Drawing Figures

CENTRIFUGAL AND ONE WAY CLUTCHES IN SERIES WITH FRICTION CLUTCH

This invention relates to a multiclutch drive providing speed responsive drive engagement and push start capability and the arrangement thereof.

The multiclutch drive has a speed responsive clutch responsive to input speed providing a drive through a normally engaged friction clutch to the output. For normal starting the normally engaged friction clutch is engaged while the engine is idling. At idle the speed responsive clutch is disengaged and drive engagement is manually controlled by manually increasing the engine fuel feed or throttle to increase engine speed to a starting speed causing the speed responsive clutch to gradually engage for initial slipping drive at low speeds and lock up drive at higher speeds.

The normally engaged friction clutch is manually disengaged to provide positive neutral. This clutch arrangement is also used to motor the engine for starting the engine by pushing the vehicle. The friction clutch is manually disengaged to provide positive neutral while pushing the vehicle to bring the vehicle speed up to the speed required to motor the engine for starting. Then the friction clutch is engaged and a drive provided through a one way clutch to the input to motor the engine for starting the engine.

When the engine starts and the engine and input speed is greater than the output speed, the one way clutch is disengaged, so the normal vehicle starting drive may be used. During normal vehicle starting and drive, the one way clutch remains disengaged, since it overruns during slipping engagement and is not engaged during lock up drive. During overrun drive, when the vehicle motors the engine, the centrifugal clutch remains locked up to low speeds substantially to idle speed because the torque is very low.

The speed responsive clutch is a shoe type centrifugal clutch having a plurality of clutch shoes pivotally mounted on a hub driven by the input shaft. The shoes are spring biased to the release position and with increasing input speed, centrifugal force provides an increasing engagement bias, to initially provide gradual clutch engagement and then at a high torque low engine speed to provide lock up engagement.

The three clutches of this drive assembly, the centrifugal clutch, the friction clutch and the one way clutch, are combined in a simple, compact arrangement which may be mounted on a short input shaft preferably an extension of the engine shaft. The one way clutch is mounted on the inboard end of the input shaft with its inner race secured to or integral with the input shaft and its outer race fixed to the disk portion of the inner centrifugal clutch drum. The centrifugal clutch hub is fixed to the outboard end of the input shaft. The centrifugal clutch has clutch shoes pivotally mounted on the hub and biased by springs to a released position and biased by centrifugal force on rotation of the input shaft and hub to engage the inner friction surface of the ring portion of the centrifugal clutch drum. The friction clutch has an outer drum having a ring portion mounted for axial movement on the ring portion of the inner centrifugal clutch drum and a disk portion providing the friction clutch apply plate mounted adjacent the centrifugal clutch drum disk portion which provides the backing plate for the friction clutch. The driven plate of the friction clutch is mounted between the disk portions of the inner and outer drums and is rotatably mounted on the outer perimeter of the outer race of the one way clutch and is fixed to the output drive gear which then is also rotatably mounted on the outer race of the one way clutch. The free end of the outer drum extends beyond the free end of the inner drum and the end of the input shaft so that a cover may be secured to the free end of the outer drum enclosing the drums with the hub and clutches therein. A belleville spring having its outer perimeter engaging the inner clutch drum and its inner perimeter engaging the cover normally biases the cover and other drum so that its disk portion functions as a clutch apply plate engaging the clutch driven plate against the disk portion of the inner drum which functions as the backing plate to spring engage the friction clutch. The belleville spring has spring fingers extending through axial slots in both drums so both drums rotate together but have relative axial sliding movement to apply and release the friction clutch. The friction clutch release lever engages the cover to move against the bias of the belleville spring and thus move the outer drum and its disk clutch apply plate to release the friction clutch.

These and other advantages of the invention will be more apparent from the following detailed description and drawing of the preferred embodiments.

Figure 1:
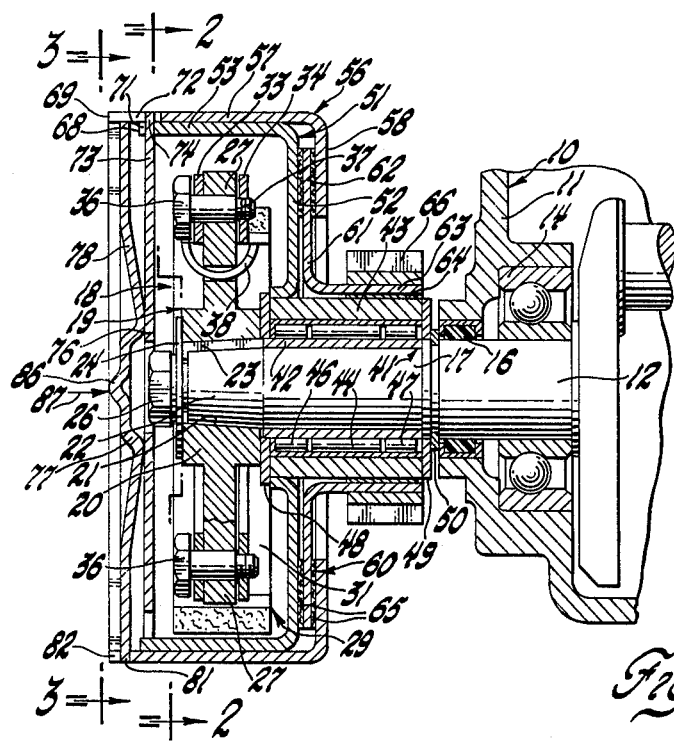
FIG. 1 is a partial sectional view of the engine and multiclutch drive on the line 1—1 of FIG. 3.
Figure 2:
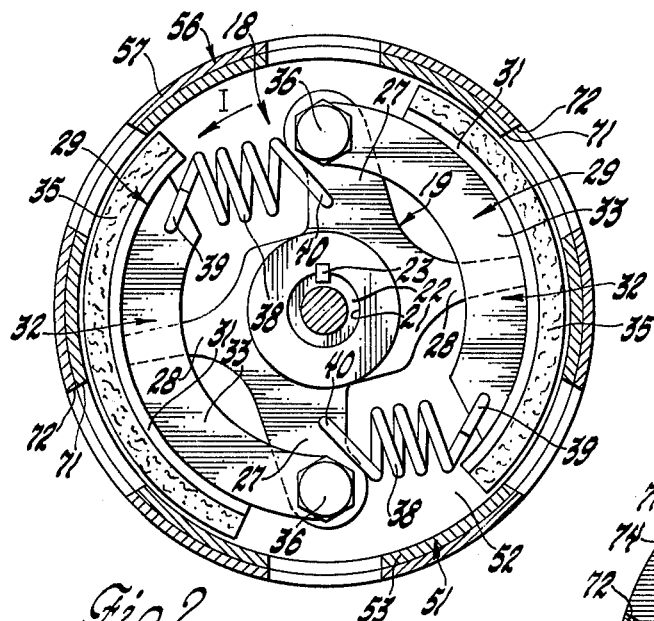
FIG. 2 is a sectional view of FIG. 1 on the line 2—2.
Figure 3:
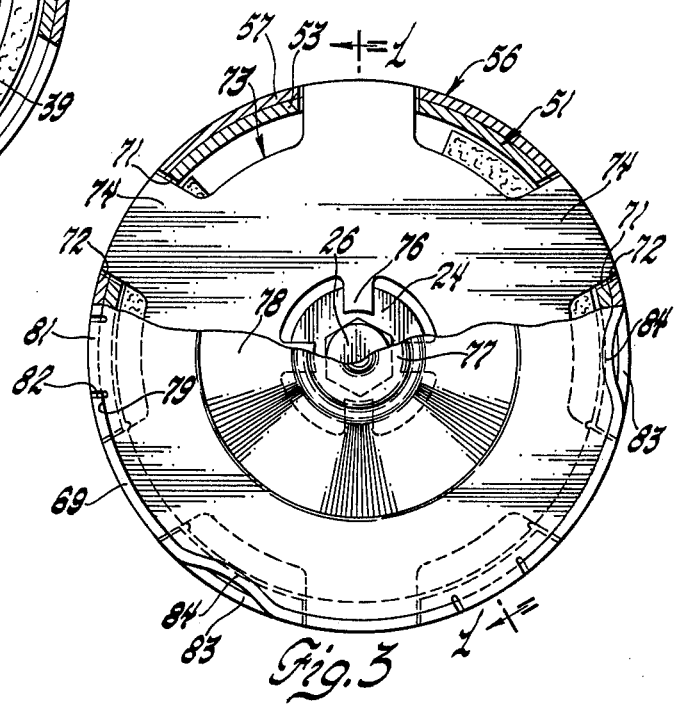
FIG. 3 is a sectional view of FIG. 1 on the line 3—3, with parts broken away to show details.

FIG. 1 partially shows an engine 10 of any conventional type having a housing 11, a crank or power output shaft 12 rotatably mounted in a bearing 14 supported on the housing, a shaft seal 16 outboard of the bearing and secured to the housing, and a manual fuel feed control and fuel feed device (not shown) such as a throttle pedal and carburetor. The engine output shaft 12 drives input shaft 17, preferably a portion of an integral engine output shaft and input shaft construction. The multiclutch drive FIGS. 1 to 3 is mounted on this short input shaft 17 or short extension of the engine output shaft extending outside the engine housing 11.

The centrifugal clutch 18 has a hub 19 having a sleeve portion 20 with a tapered bore 21 fitting the tapered portion 22 on the input shaft 17 at the outboard end. A key 23 fitting in suitable grooves in the tapered portion and the tapered bore prevents relative rotation between the hub and shaft. A washer 24 and screw 26 fastened in the end of shaft 17 secures the hub 19 axially on the tapered portion of shaft 17. The hub 19 has a pair of pivot arms 27 FIG. 2 oppositely disposed relative to the shaft axis and an intermediate pair of guide arms 28 which are oppositely disposed and located between the pivot arms, both formed integrally with sleeve portion 20. The clutch shoes 29 each have a circular flange 31 supporting friction material facing 35 and secured to a web structure 32 consisting of two spaced webs 33 and 34 located on opposite sides of its associated pivot arm and guide arm. The webs 33, 34 extend beyond the flange 31 at the leading end with respect to the direction of rotation, (arrow I) and are pivoted by bolt pivot 36 which extends through suitable apertures in both webs and the pivot arm and is secured in place by threads 37 in one web. Each clutch shoe 29 extends from its pivoted end at its pivot arm 27 in the direction opposite the direction of input rotation (arrow I) and output rotation partially toward the other pivot arm. Each clutch shoe 29 has a coil tension spring 38 having a hook portion 39 extending through the webs of its clutch shoe and at the opposite end a hook 40 extending through a suitable aperture in the pivot arm for the other clutch shoe. The clutch shoe webs straddle the guide arms for relative sliding and guiding movement.

The one way clutch 41 has an inner race 42 secured to the input shaft 17 between the taper 22 and the inboard end adjacent the engine housing 11 and an outer race 43. The one way clutch has between the inner and outer races centrally located clutch rollers 44 and at each side thereof bearing rollers 46, 47 which may be mounted in a cage. The clutch rollers 44 contact the smooth cylindrical external surface of the inner race and the cam internal surface of the outer race to provide one way drive when the outer race tends to overrun in the direction of input rotation (arrow I) the inner race or input shaft and to disengage when the inner race and input shaft overruns or runs at a faster speed than the outer race. The bearing rollers 46, 47 contact circular bearing race portions on the inner and outer race to rotatably support the outer race 43 which rotatably supports the centrifugal clutch drum 51 with respect to input shaft 17.

The one-way clutch 41 is retained against axial movement relative to shaft 17 by thrust washer 48 located between the hub 19 and the one-way clutch and by thrust washer 49 retained on the shaft 17 by snap ring 50.

The centrifugal clutch drum 51 has an annular disk portion 52 having its free inner edge secured as by welding to the outer race 43 and its cylindrical ring portion 53 radially aligned with the clutch shoes 29. The outer drum 56 has a ring portion 57 supported for sliding movement on the ring portion 53 of inner drum 51 and a disk portion 58 extending radially inwardly and spaced from and parallel to the disk portion 52 of the inner drum 51. The driven disk 61 has a radially extending annular disk portion 62 having a friction material facing 65 on each side located between the inner drum disk portion 52 which acts as a backing plate and the outer drum disk portion 58 which acts as an apply plate of a friction clutch 60. The driven plate 61 also has an output cylindrical sleeve 63 mounted for relative rotation and axial movement by the bearing sleeve 64 on the outer race 43 of the one-way clutch 41. The output sleeve 63 is secured to the output gear 66 which is connected by a suitable output gear drive or chain drive directly or through a forward and reverse transmission to the vehicle drive wheels.

The inner drum 51 terminates at a free end 68 which is inboard of the free end 69 of the outer drum 56. The inner drum ring portion 53 has at the free end six circumferentially equally spaced abutment recesses 71. The outer drum ring portion 57 also has six equally circumferentially spaced spline recesses 72. The Belleville or disk-type spring 73 has at its outer perimeter six equally circumferentially spaced outer spring fingers 74 having the same circumferential width as the abutment recess 71 and the spline recess 72, so that the spring fingers act as a spline device to cause the inner and outer drums 51, 56, to rotate together but to permit relative axial movement. The outer spring fingers 74 abut the base of the recesses 71 to transmit spring reaction force through the inner drum 51 and the one-way device 41 to the input shaft 17 to ground the outer perimeter of the spring 73. The spline recesses 72 have a greater depth to provide clearance at all times for axial movement of the outer drum 56 relative to the outer spring fingers 74. The Belleville spring 73 has at its inner perimeter a plurality of inner fingers 76 which engage the circular abutment 77 on the central portion of the cover 78. The cover 78 has an outer perimeter 79 fitting within the outer drum cylindrical portion 57 and three equally circumferentially spaced tabs 81 which fit into three equally circumferentially spaced recesses 82 at the free edge 69 of the outer drum cylindrical portion 57. The tabs 81 and recesses 82 are located in three of the spaces between the spline recesses 72 for outer spring fingers 74. A fastener is provided by three equally circumferentially spaced slots 83 in the remaining spaces between spline recesses 72 closely adjacent the free end 69 of the ring portion 57, which are displaced inwardly to form fasteners 84 which prevent outboard direction movement of the cover 78 relative to the outer drum 56. Since the tabs 81 of the cover 78 abut the recesses 82, the cover is secured to the outer drum 56. The cover 78 has a central dimple 86 which is engaged by a clutch release lever linkage 87 diagrammatically indicated by an arrow indicating the direction of the application of the friction clutch release force.

MODIFICATION

Figure 4:
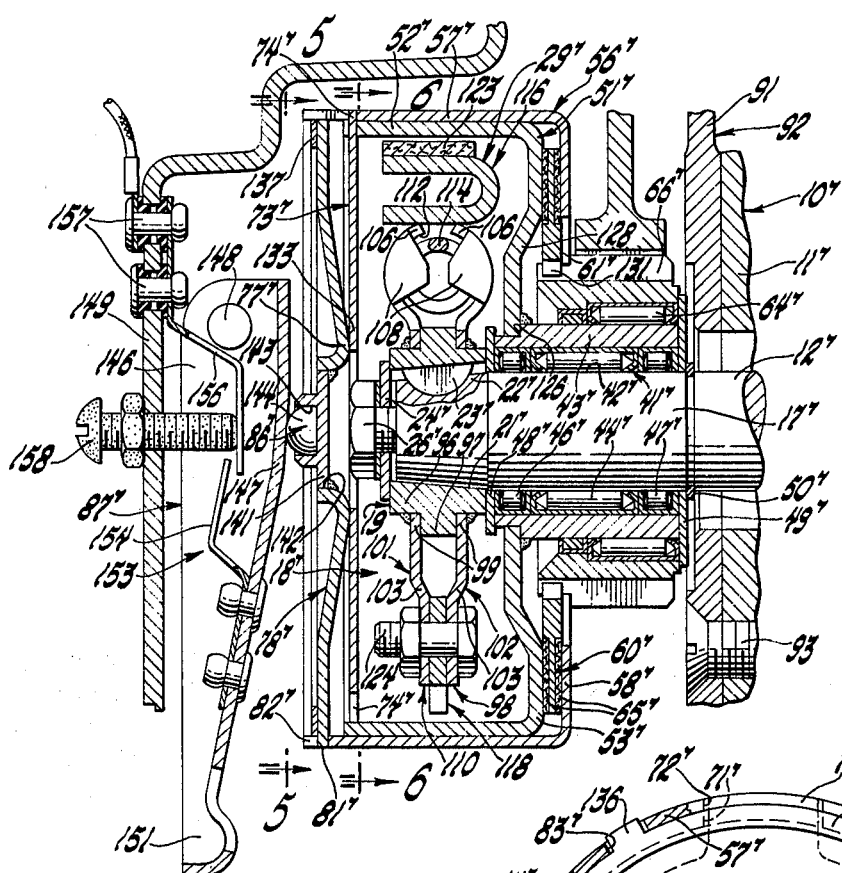
FIG. 4 is a sectional view of an engine and a modified multiclutch drive on the line 4—4 of FIG. 6.
Figure 5:
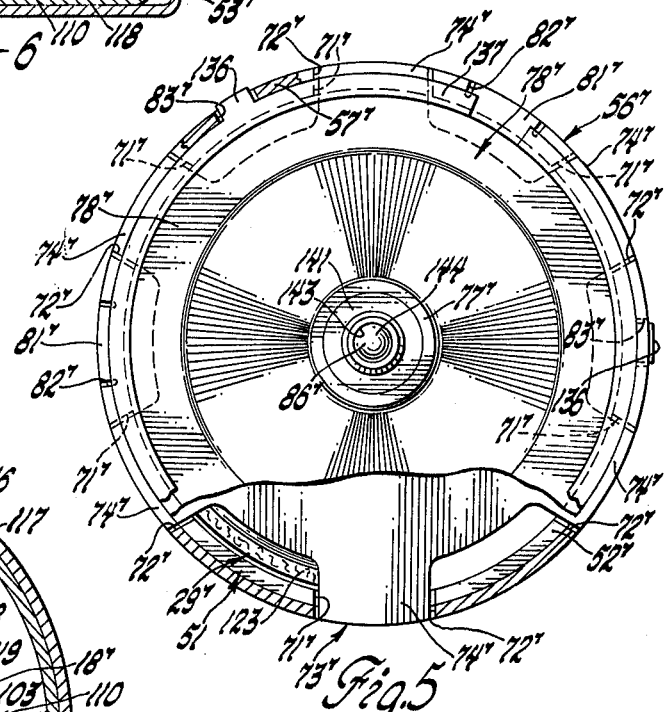
FIG. 5 is a sectional view of FIG. 4 on the line 5—5.
Figure 6:
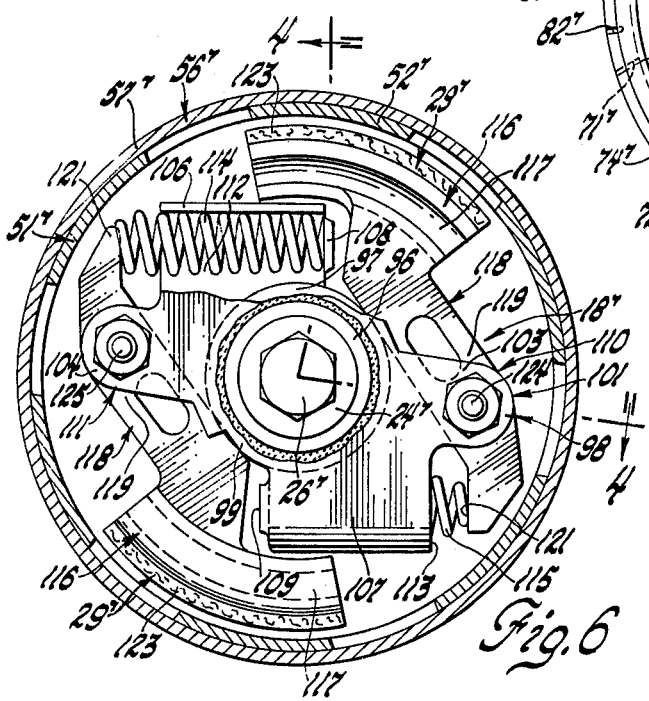
FIG. 6 is a sectional view of FIG. 4 on the line 6—6.

The modified multiclutch drive shown in FIGS. 4 to 6 basically functions in the same manner as the above multiclutch drive of FIGS. 1 to 3, and like reference numerals primed, with reference to the above description are used to describe similar components and subassemblies. Additional reference numerals are used in the following description of the improved components. The conventional engine 10' has the housing 11' and an engine output shaft 12' mounted in suitable engine bearings (not shown) and driving the clutch input shaft 17'. An inboard portion 91 of the clutch housing 92 is shown secured by fasteners such as screws 93 to the engine housing 11'. The centrifugal clutch 18' has a hub 19' having a hub sleeve 96 with a similar tapered bore 21' fitting the tapered shaft portion 22' and is secured against rotation by the key 23' and axially secured by the washer 24' and screw 26'. The sleeve hub 96 has central external securing flange 97 used to locate and secure the hub arm assembly 98 to the sleeve hub 96. The hub arm assembly 98 is formed of two allochirally or mirror image related arm portions 101 and 102, each having a central annular securing portion 99 surrounding the sleeve hub 96 and abutting the flange 97 and welded to the sleeve hub 96, each having two pivot arms 103, 104 extending radially oppositely from the annular portion 99 and each having two semicylindrical spring guides 106, 107 located oppositely and between the pivot arms 103, 104 in tangential relation to the annular portion 99 with a spring seat portion 108, 109 at the end of the spring guides 106, 107 remote from its associated pivot arm pivot end. When arm portions 101 and 102 are secured to sleeve hub 96 in allochirally facing and aligned relation, each pair of pivot arms 103, 104 form respectively, the first and the second bifurcated pivot arms 110, 111 and each pair of semicylindrical spring guides 106, 107, respectively, form a cylindrical spring chamber 112, 113 to receive compression springs 114, 115 which seat against the seat portions 108, 109.

Each of the clutch shoes 29' has a one-piece support member 116 formed as a one-piece stamping having a circular rim portion 117 having a U-shaped section at one end with equal-length legs. At the other end, the inner leg is shorter so the integral pivot lever 118 extending from the shorter portion of the inner leg extends from the axial central portion of the support member 116. Each pivot lever 118 has an intermediate pivot portion 119 and an end spring seat portion 121. The clutch shoes 29' have a friction facing 123 suitably secured to the radial outer leg of the U-shaped section of support member 116. One clutch shoe 29' has its pivot lever 118 located between the pair of arms 103 of bifurcated arm 110 for lateral stability, is pivoted at its intermediate portion 119 by bolt pivot 124 to bifurcated arm 110 and at its spring seat 121 engages spring 115 which biases the clutch shoe to disengage position. The other identically constructed clutch shoe 29' similarly has its pivot lever 118 located between the arms 104 of bifurcated arm 111 and is pivoted at its intermediate portion 119 by pivot bolt 125 to bifurcated arm 111 and at its spring seat 121 engages spring 114.

The one-way clutch 41' is similar to the one-way clutch 41 except the inner cylindrical race 42' is an integral portion of shaft 17' and the outer race 43' has an external recess 126 to receive the centrifugal clutch drum 51', the thrust washers 48', 49' and snap ring 50' for axially locating the one-way clutch 41' are the same.

The centrifugal clutch or inner drum 51' similarly has a ring portion 52' and a disk portion 53' but the disk portion has an axial off-set 128 to provide clearance with respect to the driven plate 61' and output gear 66'. The outer drum 56' for the friction clutch 60' has a similar ring portion 57' and disk portion 58'. The driven plate 61' is a thicker disk plate having internal splines 131 for direct spline engagement with the output gear 66'. The driven plate 61' is recessed on each side to receive the friction facings 65'. The bearing 64' is a sealed roller bearing positioned directly between the outer diameter of outer race 43' of the one-way clutch 41' and the internal diameter of output gear 66' to directly rotatably support the output gear 66' on the outer race 43'.

The Belleville spring 73' is similar and has similar spring fingers 74' cooperating with abutment recesses 71' in the inner drum 51' and spline recesses 72' in the outer drum 56'. The Belleville spring 73' at its inner perimeter 133 has the inner spring fingers 76 omitted and has annular contact with the circular abutment 77' on the cover 78'. The cover 78' is similar and has attaching tabs 81' fitting in recesses 82' in ring portion 57' of the outer drum 56'. The ring portion 57' has slots 83' which are wider than slots 83 so they can receive the tab portions 136 of an internal snap ring 137 to secure the cover 78' to the outer drum 56'. The dimple 86' is modified and has a separate circular insert 141 welded in a central opening 142 in the center of the cover 78'. The insert 141 has a socket 143 to receive a hardened steel or plastic button member 144 which cooperates with the clutch release lever 87' shown in detail. The clutch release lever linkage 87' has a lever 146 of U-shaped section positioned so an intermediate portion of the web 147 engages the button member 144 and having one end pivoted by pivot pin 148 to the outboard portion 149 of clutch housing 92. The manual lever 146 extends from the pivot pin 148 across the button 144 through an opening in the housing portion 149 so that its actuator end 151 is positioned outside the housing 92 and may be connected by a suitable lever or sheath cable to a manual actuator (not shown). A suitable neutral switch 153 has a contact 154 secured and electrically connected to the lever 146 and the contact 156 secured in insulating relation by the insulating fasteners 157 to the housing portion 149. An adjusting screw and suitable lock-nut 158 of plastic or other insulating material is secured to the housing portion 149 and adjusts the position of contact 156 so that the contacts 154, 156 make contact when the release lever 146 moves the cover 78' and outer drum 56' to release the friction clutch 60' providing positive neutral.

OPERATION

While it is believed that the operation of the multiclutch drives will be apparent from the above structural description, the operation is described below with respect to the multiclutch drive of FIGS. 1 to 3 but also applies with reference numerals primed to the multiclutch drive of FIGS. 4 to 6.

In order to release the multiclutch drive to provide positive neutral, the clutch release lever linkage 87 is moved from an apply position to a release position to disengage the friction clutch 60. When the clutch release lever linkage 87 is moved from the apply position to the release position, it engages the dimple 86 of the cover 78 and moves the cover 78 toward input shaft 17. During this movement the cover 78, through its circular abutment 77, engages the inner portion of Belleville spring 73 and deflects the spring, since the outer perimeter of the Belleville spring is grounded. The outer portion of the Belleville spring 73 is grounded through its spring fingers 74 which engage the base of the abutment recesses 71 in the ring portion 53 of the inner clutch drum 51 which is secured to the outer race 43 of the one-way clutch 41 which is grounded by the thrust washer 49 and snap ring 50 to the input shaft 17. During this release movement, the cover 78, through its tabs 81 which seat on the base of the securing recesses 82 in the ring portion 57 of the outer drum 56, move the outer drum 56 in the same direction to move the apply plate disk 58 in a release direction away from the driven plate 61 to release the friction clutch 60. When the release lever linkage 87 is moved away from the cover 78 to the apply position, which is free of the cover, the Belleville spring 73, having its outer perimeter grounded as pointed out above, acts to apply a friction clutch engaging spring biasing force at its inner perimeter to the annular abutment 77 of the cover 78. This apply force is similarly connected as described above with respect to the release force to move the outer drum 56 and its apply disk 58 to engage the driven plate 61 against the disk backing plate 52 to apply the friction clutch 60.

When the engine is cranked by a starting motor to start the engine, the friction clutch may be released to provide a positive neutral. If the engine and its starting equipment will not increase the engine speed significantly above idle speed, the friction clutch may be engaged during starting as the centrifugal clutch will remain disengaged. For normal driving, the friction clutch is engaged by the spring 73 by moving the release lever linkage 87 to the apply position and then the manual fuel feed control of engine 11 is advanced to increase fuel feed and engine speed to cause the centrifugal clutch 18 to engage. As engine speed is increased, in a high-torque low-speed range, the centrifugal clutch 18 centrifugally engages with increasing torque and, at a torque sufficient to drive the vehicle when output speed approaches input speed, provides lock-up engagement and thereafter continues lock-up engagement during this vehicle drive operation. The centrifugal clutch 18 also remains locked up during overrun operation substantially throughout the entire engine speed range, so the one-way clutch 41 remains disengaged during normal drive operation. During overrun operation, at low speeds approaching idle speed, torque is very low so the centrifugal clutch 18 remains engaged to such low speeds.

Thus, during normal drive operation, the input shaft 17 provides a drive through hub 19 and clutch shoes 29 to the inner drum 51, and then through the friction clutch 60 to the driven plate 61 which drives the output gear 66. During this drive, the friction clutch 60, which is spring-biased to engagement, is calibrated to transmit maximum drive torque and will slip under any abnormally high torque condition.

When it is desired to motor the engine for starting by pushing the vehicle, the friction clutch 60 is manually released to provide a positive neutral while vehicle speed is brought up to a sufficient speed to provide engine motoring for starting. Then the friction clutch 60 is manually engaged to drive the outer race 43 of the one-way clutch 41 which will engage the one-way clutch 41 and drive the input shaft 17 to motor the engine for starting. During this engine starting operation, the centrifugal clutch 18 remains disengaged while the engine is started and operates at or near idle speed. The centrifugal clutch 18 will then engage when engine speed is manually increased to engaging speed used in normal driving as described above.

In these multiclutch drives, the input shaft 17 is connected by centrifugal clutch 18 and one way clutch 41 in parallel drive relation to each other and both are connected in series by friction clutch 60 to output gear 66. The inner clutch drum 51 is an intermediate drive member connected by friction clutch 60 to output gear 66 and by either centrifugal clutch 18 or one way clutch 41 to input shaft 17.

In FIGS. 1 to 3, the centrifugal clutch shoes 29 as best shown in FIG. 2, are pivoted at one end to the hub 19 and biased in a release direction by tension spring 38 connected between the hub 19 and the other end of the clutch shoes. The clutch shoes are pivoted at the leading end, and connected to spring 38 at the trailing end with respect to rotation (arrow I) of the centrifugal clutch drum 51 during drive operation. The clutch shoes are pivoted so the centrifugal engagement is not self-energizing so that the torque capacity is more directly proportional to the centrifugal force to provide smoother gradual engagement with increasing speed.

The basic operation of the modification shown in FIGS. 4 to 6 is the same. The structure of the hub 19', is modified to employ a hub arm assembly 98 having sheet metal arm members 101, 102 and one-piece sheet metal clutch shoes 29' as described above. The clutch shoes 29' have a support member 116 of one-piece stamped construction. Each clutch shoe support member 116 has a lever 118 providing a pivot beyond the leading end of the clutch shoe 29' with respect to the direction of rotation of the engine 11' and input shaft 17' (arrow I). The release springs 114, 115 are compression type springs and engage spring seat 121 on the opposite side of the bolt pivots 124, 125 with respect to the clutch shoe 29' to bias the clutch shoe 29' in the release direction. The geometry of clutch shoe 29' provides nonself-energizing engagement in response to centrifugal force proportional to engine speed to provide smooth clutch engagement during vehicle starting.

It will be apparent that other modifications of the invention may be made.

What is claimed is:

1. In a multiclutch drive: an input shaft; a one-way clutch having an inner race drive connected to said input shaft, an outer race, bearing and one-way drive means between said races to rotatably support said outer race concentrically on said inner race and to provide engagement for drive when said outer race overruns said inner race in the normal drive direction and disengagement when said inner race overruns said outer race in the normal drive direction, and thrust means to prevent axial movement of said races relative to said input shaft; a centrifugal clutch having a hub mounted on said input shaft for rotation with said input shaft, an inner drum having an inner cylindrical portion with an internal cylindrical friction surface concentric with said hub and with a free end, said inner drum also having a disk portion extending radially inward from the opposite end of said inner cylindrical portion and fixed to said outer race to provide a drive connection and to axially ground said inner drum, said disk portion having an external friction surface backing plate disk portion, clutch shoes pivoted on said hub, spring biasing means connected to said hub and clutch shoes to bias said clutch shoes to a disengaged position, and said clutch shoes rotating with said input shaft and hub and operative in response to input shaft speed above idle speed to provide a centrifugal bias force for starting torque drive to provide slipping drive and then at higher torque input speed provide lock-up drive as centrifugal clutch torque meets drive torque requirements; an outer drum having an outer cylindrical portion supported on said inner cylindrical portion of said inner drum for relative axial movement with a free end and with a clutch apply plate disk portion at the opposite end extending radially inwardly and facing said backing plate disk portion; a clutch driven disk plate positioned between said backing plate disk portion and apply plate disk portion providing a manual clutch; an output member drive connected to said clutch driven disk plate; a manual clutch actuator member secured to said free end of said outer drum and extending across the center of said drums and having a clearance relation with said inner drum, said centrifugal clutch and input shaft during movement between engaged and disengaged positions; said inner cylindrical portion having abutment recesses; said outer cylindrical portion end having spline recesses; a belleville spring having outer spring fingers engaging in said abutment recesses to axially locate and ground the outer perimeter of said belleville spring through said inner drum and one way clutch to said input shaft and extending through said abutment recesses and spline recesses with axial clearance relative to said outer drum for said axial movement of said outer drum to cause said inner and outer drums to rotate together and permit axial engaging and disengaging movement of said outer drum relative to said axially grounded inner drum for engaging and disengaging said manual clutch and said belleville spring having an inner portion engaging said manual clutch actuator member to bias said actuator member and outer drum to engage said manual clutch; and manual means engaging said actuator member to move said actuator member and outer drum against the belleville spring bias to disengage said manual clutch.

2. In a multiclutch drive: an input shaft having an inboard portion and an outboard portion; a one-way clutch having an inner race drive connected to said inboard portion, an outer race, bearing and one-way drive means between said races to rotatably support said outer race concentrically on said inner race and to provide engagement for drive when said outer race overruns said inner race in the normal drive direction and disengagement when said inner race overruns said outer race in the normal drive direction, and thrust means to prevent axial movement of said races relative to said input shaft; a centrifugal clutch having a hub mounted on said outboard portion for rotation with said input shaft, an inner drum having an inner cylindrical portion with an internal cylindrical friction surface concentric with said hub and with a free end extending beyond said outboard portion of said input shaft, said inner drum also having a disk portion extending radially inwardly from the opposite end of said inner cylindrical portion and fixed to said outer race to provide a drive connection and to axially ground said inner drum, said disk portion having an external friction surface backing plate disk portion; clutch shoes pivoted on said hub, spring biasing means connected to said hub and clutch shoes to bias said clutch shoes to a disengaged portion, and said clutch shoes rotating with said input shaft and hub and operative in response to input shaft speed above idle speed to provide a centrifugal bias force for starting torque drive to provide slipping drive, and then at higher torque input speed to provide lock-up drive as centrifugal clutch torque meets drive torque requirements; an outer drum having an outer cylindrical portion supported on said inner cylindrical portion of said inner drum for relative axial movement with a free end farther outboard than said free end of said inner cylindrical portion and with a clutch apply plate disk portion at the opposite end extending radially inwardly and facing said backing plate disk portion; a clutch driven disk plate positioned between said backing plate disk portion and apply plate disk portion providing a manual clutch; an output member rotatably mounted on said outer race and drive connected to said clutch driven disk plate; a clutch cover member secured to said free end of said outer drum and extending across the center of said drums and having a clearance relation with said inner drum and said centrifugal clutch during movement between engaged and disengaged positions; said inner cylindrical portion at said free end having abutment recesses; said outer cylindrical portion at said free end having spline recesses; a belleville spring having outer spring fingers engaging in said abutment recesses to axially locate and ground the outer perimeter of said belleville spring through said inner drum and one-way clutch to said input shaft and extending through said abutment recesses and spline recesses with axial clearance relative to said outer drum for said axial movement of said outer drum to cause said inner and outer drums to rotate together and permit axial engaging and disengaging movement of said outer drum relative to said axially grounded inner drum for engaging and disengaging said manual clutch, and said belleville spring having an inner portion engaging said clutch cover member to bias said clutch cover member and outer drum to engage said manual clutch; and manual means engaging said cover member to move said cover member and outer drum against said belleville spring bias force to disengage said manual clutch.

3. In a multiclutch drive: an input shaft; one-way clutch means having an outer race rotatably mounted on said input shaft, one-way drive means between said input shaft and outer race to provide engagement for drive when said outer race overruns said input shaft in the normal drive direction and disengagement when said input shaft overruns said outer race in the normal drive direction, and thrust means to prevent axial movement of said outer race relative to said input shaft; a centrifugal clutch having an inner drum having a cylindrical portion with an internal cylindrical friction surface concentric with said input shaft and with a free end, said inner drum also having a disk portion extending from the opposite end of said inner cylindrical portion and fixed to said outer race to provide a drive connection and to axially ground said inner drum, said disk portion having an external friction surface backing plate disk portion; clutch means mounted on said input shaft for rotation with said input shaft and radial movement to engage said internal cylindrical friction surface, biasing means connected to said input shaft and clutch means to bias said clutch means to a disengaged position, and said clutch means rotating with said input shaft and operative in response to input shaft speed above idle speed to provide a centrifugal bias force for starting torque drive to provide slipping drive and then at higher torque input speed to provide lock-up drive as centrifugal clutch torque meets drive torque requirements; an outer member having an outer portion supported externally on said cylindrical portion of said inner drum for relative axial movement with a free end and with a clutch apply plate disk portion at the opposite end facing said backing plate disk portion; a clutch driven disk positioned between said backing plate disk portion and apply plate disk portion providing a manual clutch; an output member drive connected to said clutch driven disk; an actuator member for said manual clutch secured to said free end of said outer member and extending radially inwardly and having a clearance relation with said inner drum, said centrifugal clutch and input shaft permitting movement between engaged and disengaged positions; said inner cylindrical portion having spline and stop means; said outer portion having spline means; a belleville spring having an outer portion with means engaging in said spline and stop means to axially locate and ground the outer perimeter of said belleville spring through said inner drum and one-way clutch means to said input shaft and extending to said spline means to cause said inner drum and outer member to rotate together and permit axial engaging and disengaging movement of said outer member and actuator member relative to said axially grounded inner drum for engaging and disengaging said manual clutch; said belleville spring having an inner portion engaging said actuator member to bias said actuator member and outer member to engage said manual clutch; and manual means engaging said actuator member to move said actuator member and outer member against said belleville spring bias force to disengage said manual clutch.

4. In a multiclutch drive: an input shaft; one-way clutch means having an outer race rotatably mounted on said input shaft, one-way drive means between said input shaft and outer race to provide engagement for drive when said outer race overruns said input shaft in the normal drive direction and disengagement when said input shaft overruns said outer race in the normal drive direction, and thrust means to prevent axial movement of said outer race relative to said input shaft; a centrifugal clutch having an inner drum having a cylindrical portion with an internal cylindrical friction surface concentric with said input shaft and with a free end, said inner drum also having a disk portion extending from the opposite end of said inner cylindrical portion and fixed to said outer race to provide a drive connection and to axially ground said inner drum, said disk portion having an external friction surface backing plate disk portion; clutch means mounted on said input shaft for rotation with said input shaft and radial movement to engage said internal cylindrical friction surface, biasing means connected to said input shaft and clutch means to bias said clutch means to a disengaged position, and said clutch means rotating with said input shaft and operative in response to input shaft speed above idle speed to provide a centrifugal bias force for starting torque drive to provide slipping drive and then at higher torque input speed to provide lock-up drive as centrifugal clutch torque meets drive torque requirements; an outer member having an outer portion supported externally on said cylindrical portion of said inner drum for relative axial movement with a free end and with a clutch apply plate disk portion at the opposite end facing said backing plate disk portion; a clutch driven disk positioned between said backing plate disk portion and apply plate disk portion providing a manual clutch; an output member drive connected to said clutch driven disk; an actuator cover for said manual clutch secured and sealed to said free end of said outer member and extending radially inwardly and having a clearance relation with said inner drum, said centrifugal clutch and input shaft permitting movement between engaged and disengaged positions; said inner cylindrical portion having spline and stop means; said outer portion having spline means; a belleville spring having an outer portion with means engaging in said spline and stop means to axially locate and ground the outer perimeter of said belleville spring through said inner drum and one-way clutch means to said input shaft and extending to said spline means to cause said inner drum and outer member to rotate together and permit axial engaging and disengaging movement of said outer member and actuator cover relative to said axially grounded inner drum for engaging and disengaging said manual clutch; said belleville spring having an inner portion engaging said actuator cover to bias said actuator cover and outer member to engage said manual clutch; manual means engaging said actuator cover to move said actuator cover and outer member against said belleville spring bias force to disengage said manual clutch; and said actuator cover, said outer member, said inner drum and its disk portion providing a chamber enclosing said centrifugal clutch.

* * * * *

UNITED STATES PATENT AND TRADEMARK OFFICE
CERTIFICATE OF CORRECTION

PATENT NO. : 4,106,605

DATED : August 15, 1978

INVENTOR(S) : Frank J. Winchell

It is certified that error appears in the above-identified patent and that said Letters Patent are hereby corrected as shown below:

Column 9, line 25, "portion" should read -- position --

Signed and Sealed this

Fifteenth Day of May 1979

[SEAL]

Attest:

RUTH C. MASON
*Attesting Officer*

DONALD W. BANNER
*Commissioner of Patents and Trademarks*